Figure 1:
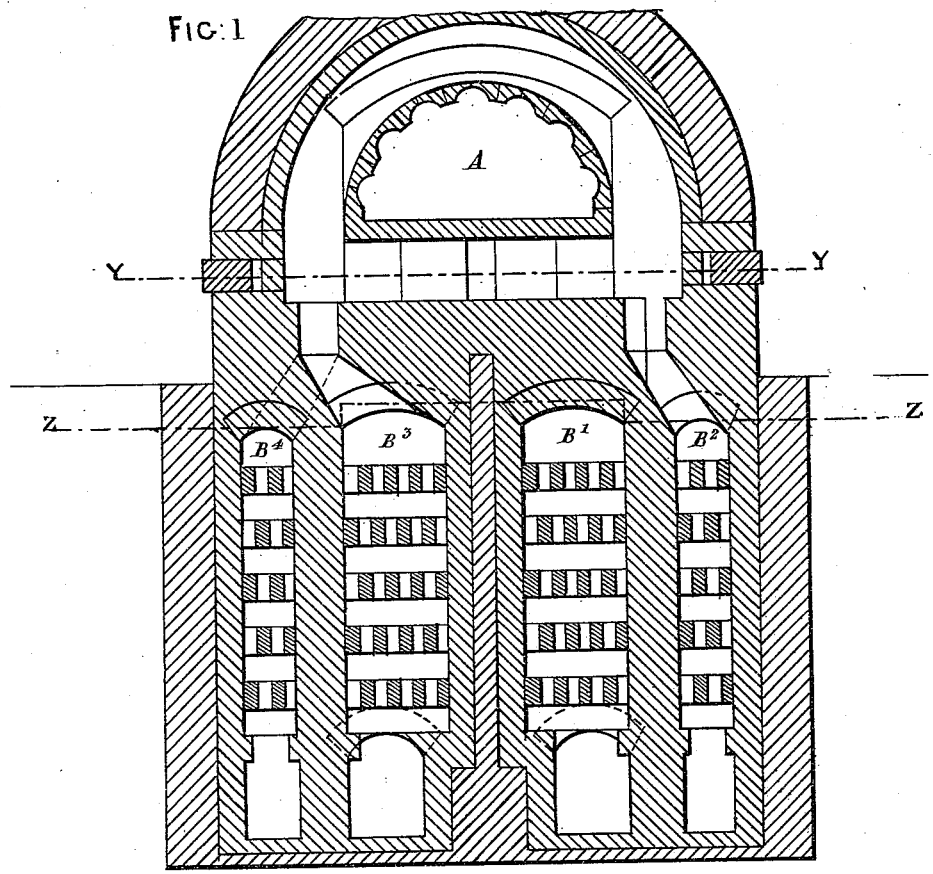

F. SIEMENS.
HARDENING, TEMPERING AND PRESSING GLASS.

No. 192,537. Patented June 26, 1877.

Attest:
H. L. Perrine
A. M. Cumming

Frederick Siemens
Inventor.
By James L. Norris
Attorney.

F. SIEMENS.
HARDENING, TEMPERING AND PRESSING GLASS.

No. 192,537. Patented June 26, 1877.

Attest:
H. L. Perrine.
A. M. Cumming.

F. Siemens
Inventor.
By James L. Norris
Atty.

F. SIEMENS.
HARDENING, TEMPERING AND PRESSING GLASS.

No. 192,537.

4 Sheets—Sheet 3.

Patented June 26, 1877.

Attest
H. L. Pennie
A. M. Cumming

Frederick Siemens.
Inventor.

By James L. Norris,
Atty.

F. SIEMENS.
HARDENING, TEMPERING AND PRESSING GLASS.

No. 192,537. Patented June 26, 1877.

Attest:
H. L. Pennie
A. M. Cumming

Inventor.
Frederick Siemens.
By James L. Norris
Atty.

UNITED STATES PATENT OFFICE.

FREDERICK SIEMENS, OF DRESDEN, GERMANY.

IMPROVEMENT IN HARDENING, TEMPERING, AND PRESSING GLASS.

Specification forming part of Letters Patent No. 192,537, dated June 26, 1877; application filed April 10, 1877. Patented in England, December 3, 1875, for 14 years.

*To all whom it may concern:*

Be it known that I, FREDERICK SIEMENS, of Dresden, in the German Empire, have invented an Improvement in Hardening, Tempering, and Pressing Glass; and do hereby declare that the following description, taken in connection with the accompanying drawings, hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

My invention relates to means of hardening and tempering glass according to the known process of heating it, and then suddenly cooling it; and, also, to the combination therewith of means for pressing and molding glass articles, so as to give greater density and preserve their form while they are subjected to the hardening and tempering process.

The hardening and tempering process, as it is described in the specification of an English Patent granted to F. B. A. Royer de la Bastie, on the 12th August, 1874, No. 2,783, consists in heating the glass articles to a high temperature, and then plunging them, while hot, into a liquid at a lower temperature.

My invention consists in an improved process of hardening articles of glass by heating the same, after having been completely shaped, until they are in a plastic or semi-plastic state, and, while in this condition, subjecting them to pressure in molds at a lower temperature than said articles.

According to my invention, when the glass articles are such as are usually molded, I effect their hardening and tempering at the same time with their pressing, so as to produce a hard and pressed glass by the use of molds of metal or other suitable material, in which the glass articles, after having been completely shaped, and while they are in a highly-heated condition, are squeezed, the molds having the effect of giving the necessary cooling without having recourse to a liquid bath.

The material employed for such molds will depend upon the nature and thickness of the glass to be operated on. In cases where the cooling has to be effected rapidly, metals of good conducting power, such as copper, are to be preferred, and in cases where the cooling has to be effected more gradually, molds of earthenware or other materials that are bad conductors of heat may be used.

Again, in cases where the glass articles operated upon vary in thickness, the conductivity of different parts of the mold is varied accordingly, either by making thicker those parts of the mold which come next to the thickest parts of the glass, so as to absorb a greater amount of heat, or by making those parts of a better conducting material than the parts next the thin portions of the glass. The molds will also have to be maintained at a certain temperature, varying according as the nature of the glass to be operated upon requires that they should be cooled to a greater or less degree. It will generally be found sufficient to employ cast-iron molds that are maintained at the temperature of boiling or warm water, and earthenware molds that are kept quite cool.

The glass articles, after having been wholly shaped, are placed in a heating-oven in order to be raised to the requisite degree of heat for being subjected to the above-described pressing and cooling process, and as many glass articles when subjected for a length of time to a high temperature, such as would be necessary in the present case, are apt to get out of shape. I prefer in such cases to inclose them before placing them in the heating-oven in a casing or shell of platinum, which supports the glass and prevents it from getting out of shape while in the heating-oven, the glass article with the platinum shell upon it being then placed in the mold for the pressing and hardening process. The heating-ovens employed may be of any suitable known construction; but it is preferable to use ovens heated by gaseous fuel in order to prevent the purity of the glass from being impaired.

Figure 4:
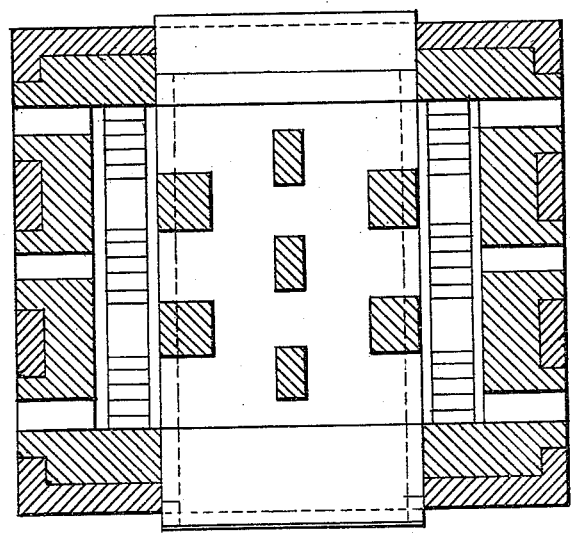
Figure 2:
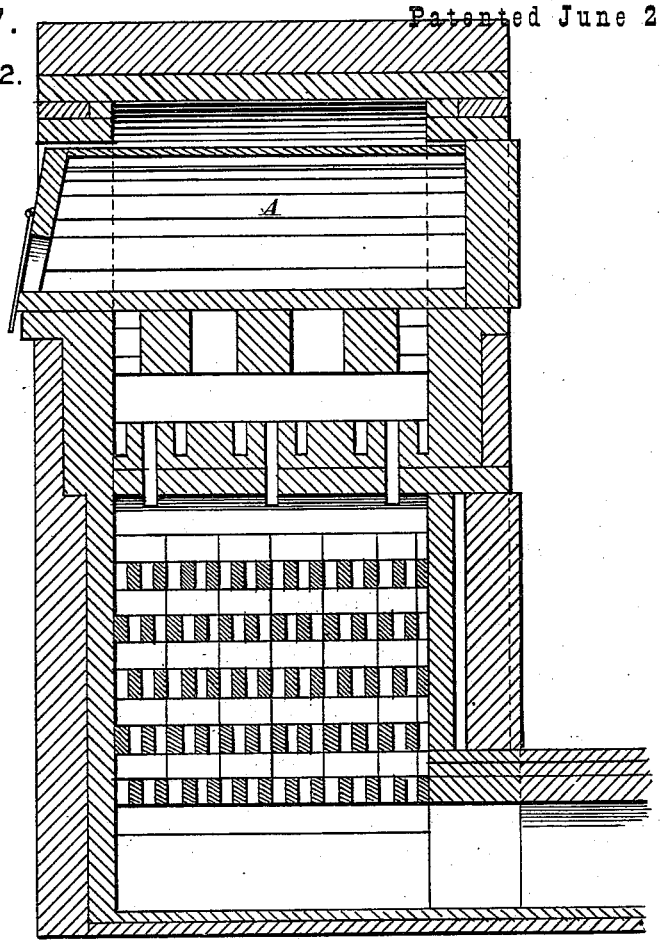
Figure 5:
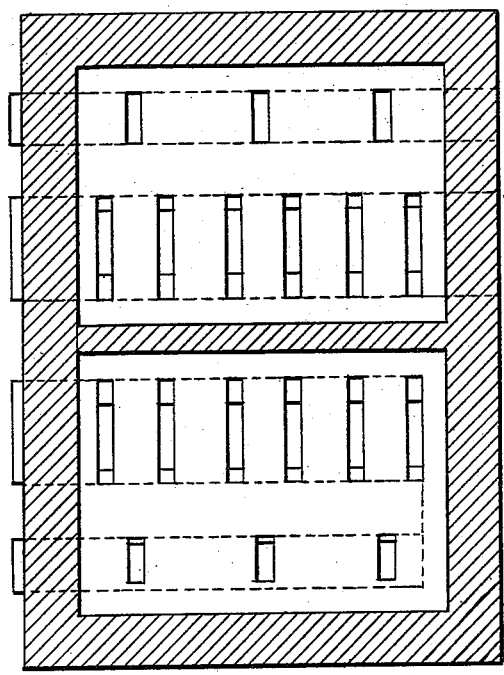
Figure 3:
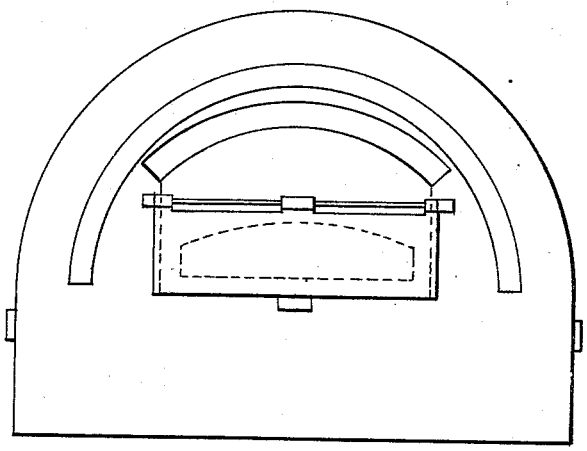

Figure 1 represents a transverse, and Fig. 2 a longitudinal, section of a regenerative-gas muffle-oven suitable for heating the glass articles that are to be hard-pressed according to my invention. Fig. 3 is a front view of this oven; and Figs. 4 and 5 are sectional plans on the lines Y Y Z Z of Fig. 1, respectively.

The muffle A is heated, both under its floor and over its crown, by the flame of the gas and air from the one pair of regenerators $B^1 B^2$, and the heated products of combustion pass off through the other pair of regenerators $B^3 B^4$ till, the first pair being sufficiently cooled and the second pair sufficiently heated, the direction of the currents is reversed for alternate working, in the usual manner. The muffle A being completely closed in, the glass articles heated in it are protected from dust and other impurities, such as in an open oven are apt to settle on the softened glass and damage its surface.

Figure 6:
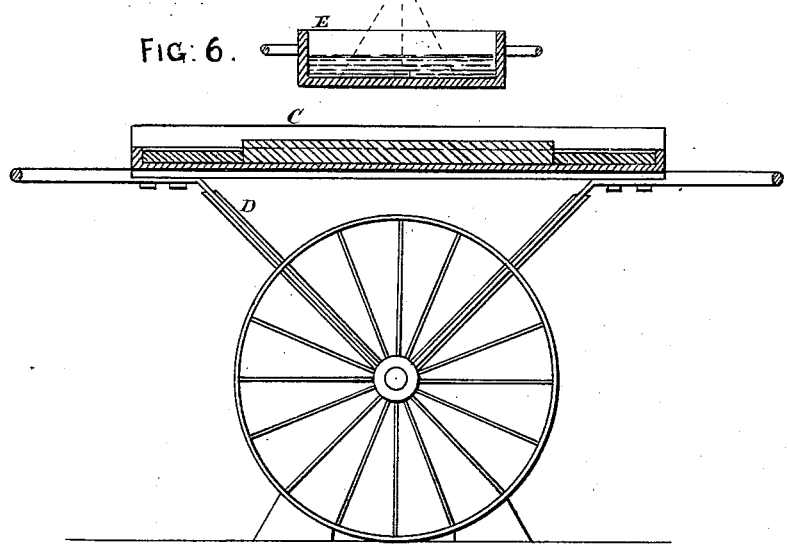
Figure 7:
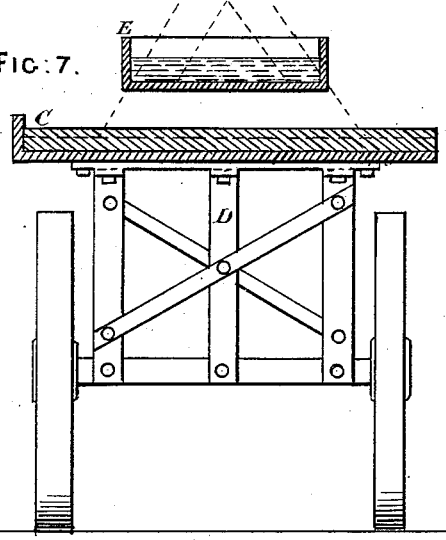
Figure 8:
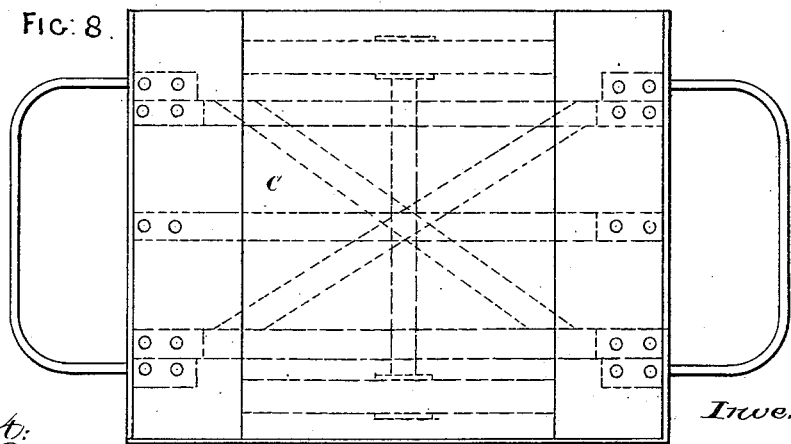

Fig. 6 is a side view, Fig. 7 an end view, and Fig. 8 a plan, of a pair of pressing-molds and carriage, such as may be conveniently employed in the hard-pressing process. The lower mold C, placed on the truck D, receives the heated glass from the oven, and the truck is then run under the upper mold E, which is let down upon it, being loaded, when necessary, to give the desired pressure. The molds shown in Figs. 6 and 7 are suited to flat glass plates. For glass articles of other shapes the molds are made of suitable form, as shown in Fig. 9, where $c$ is a hollow or concave lower mold, with a glass plate, $p$, resting on it by its edges, and $e$ is a corresponding convex upper mold, which, being lowered on the glass $p$, presses it down into the lower mold, the glass being thus, at the same time, pressed and hardened by the cooling influence of the molds.

Figure 9:
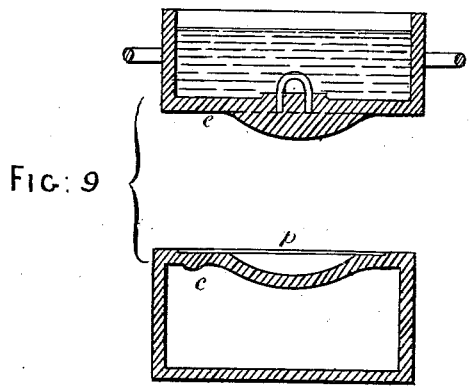

The temperature of the molds may be kept at the required point by charging them with liquid, as shown with respect to the upper molds in Figs. 6, 7, and 9. Usually, water serves for this purpose, the temperature of its boiling-point being well suited for giving the required hardening.

Having thus described the nature of my invention, and in what manner the same is to be performed, I hereby declare that I make no claim to the hardening or tempering of glass by plunging it, when heated, into a liquid bath at a lower temperature; but

I claim—

An improved process of hardening and tempering articles of glass by heating the same, after having been completely shaped, until they are in a plastic or semi-plastic state, and, while in this condition, subjecting them to pressure in molds at a lower temperature than the articles, substantially as set forth.

In testimony whereof I have signed my name to this specification, in the presence of two subscribing witnesses, this 19th day of March, A. D. 1877.

FREDERICK SIEMENS.

Witnesses:
PAUL KASTEN,
HERMANN LEITERD.